(12) United States Patent
Duret et al.

(10) Patent No.: US 8,474,244 B2
(45) Date of Patent: Jul. 2, 2013

(54) METHOD AND SYSTEM FOR INJECTING A LIQUID

(75) Inventors: Nicolas Duret, Nancy (FR); Jean-Claude Habumuremyi, Haaltert (BE); Frederic Peucat, Brussels (BE); Claude Mesjasz, Ganshoren (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 417 days.

(21) Appl. No.: 12/677,612

(22) PCT Filed: Sep. 12, 2008

(86) PCT No.: PCT/EP2008/062181
§ 371 (c)(1),
(2), (4) Date: Mar. 11, 2010

(87) PCT Pub. No.: WO2009/034174
PCT Pub. Date: Mar. 19, 2009

(65) Prior Publication Data
US 2010/0205937 A1 Aug. 19, 2010

(30) Foreign Application Priority Data
Sep. 14, 2007 (FR) ...................................... 07 57596

(51) Int. Cl.
*F01N 3/00* (2006.01)
(52) U.S. Cl.
USPC .................... 60/286; 60/274; 60/278; 60/285
(58) Field of Classification Search
USPC 60/284, 295, 285; 73/114.48, 114.45–114.49
See application file for complete search history.

(56) References Cited

U.S. PATENT DOCUMENTS

| 4,548,047 A | * | 10/1985 | Hayashi et al. ................. 62/160 |
| 5,960,627 A | | 10/1999 | Krampe et al. |

(Continued)

FOREIGN PATENT DOCUMENTS

| DE | 19636507 A1 | 3/1997 |
| DE | 19903439 A1 | 8/2000 |

(Continued)

OTHER PUBLICATIONS

U.S. Appl. No. 12/373,009, filed Jan. 8, 2009, Dougnier et al.

(Continued)

*Primary Examiner* — Thai Ba Trieu
*Assistant Examiner* — Patrick Maines
(74) *Attorney, Agent, or Firm* — Oblon, Spivak, McClelland, Maier & Neustadt, L.L.P.

(57) ABSTRACT

Method for controlling an injector intended for injecting a pollution-control liquid additive into the exhaust gases of an internal combustion engine at a flow rate governed by a given frequency and opening time of the injector, the injector having a calibration curve that establishes, at given frequency, pressure, temperature and nature of the liquid, the amount of liquid injected during an opening of the injector as a function of the duration of this opening, this curve comprising at least one linear zone (calibration line) and a non-linear zone, said method being characterized in that in the linear zone the parameters of the calibration line are used and in the non-linear zone use is made of a set opening time and a variable frequency according to at least one calibration point established for this purpose. SCR system to which this method can be applied.

9 Claims, 1 Drawing Sheet

U.S. PATENT DOCUMENTS

Figure 1:
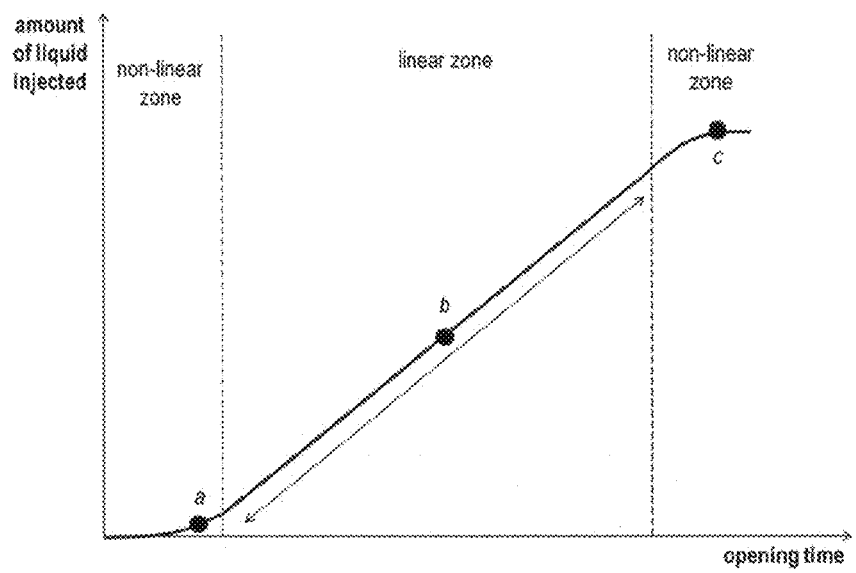

| | | | |
|---|---|---|---|
| 5,968,464 A | | 10/1999 | Peter-Hoblyn et al. |
| 6,063,350 A | | 5/2000 | Tarabulski et al. |
| 7,784,447 B2 | * | 8/2010 | Ricco et al. .................. 123/510 |
| 2004/0123585 A1 | * | 7/2004 | Yamaguchi et al. ............ 60/274 |
| 2005/0235632 A1 | | 10/2005 | Tarabulski et al. |
| 2008/0022654 A1 | * | 1/2008 | Broderick et al. .............. 60/274 |
| 2009/0199540 A1 | | 8/2009 | Kleinknecht |
| 2009/0205316 A1 | | 8/2009 | Dougnier et al. |

FOREIGN PATENT DOCUMENTS

| | | |
|---|---|---|
| FR | 2911643 A1 | 7/2008 |
| WO | WO 2008006840 A1 | 1/2008 |
| WO | WO 2008034747 A1 | 3/2008 |
| WO | WO 2008087153 A1 | 7/2008 |

OTHER PUBLICATIONS

DIN 70070 (Aug. 2003-Aug. 2005) standard : Diesel engines NOx•Reduction agent AUS 32 Quality requirements; Aug. 2005 with attached machine translation in English.

Memento des pertes de charges [Memorandum on pressure drops], I.E. Idel'cik, vol. 13, "Coefficients of singular pressure drops and of friction pressure drops", translation from Russian by Mrs Meury, 1999, p. 28, Edition Eyrolles—ISSN: 0399-4198; 5 pgs.

* cited by examiner

METHOD AND SYSTEM FOR INJECTING A LIQUID

CROSS-REFERENCE TO RELATED APPLICATIONS

This application is a U.S. national stage application under 35 U.S.C. §371 of International Application No. PCT/EP2008/062181 filed Sep. 12, 2008, which claims priority to French Patent Application No. 07.57596 filed September 14, 2007, these applications being incorporated herein by reference in their entirety for all purposes.

The present invention relates to a method for injecting a pollution-control liquid (in particular, urea) into the exhaust gases of a vehicle and also to a system that allows this method to be applied.

With the pollution control Euro V standard coming into effect for certain vehicles, devices for pollution control of $NO_x$ (or nitrogen oxides) must be put in place.

The system used by most manufacturers for reducing $NO_x$ emissions to the required value generally consists in carrying out a selective catalytic reaction with reducing agents such as urea ("Urea SCR" or selective catalytic reduction using ammonia generated in situ in the exhaust gases by decomposition of urea).

In order to do this, it is necessary to equip the vehicles with a tank containing a urea solution, a device for supplying and metering the amount of urea to be injected into the exhaust line and an injector.

Injectors have been developed specifically for this purpose and are used, for example, in the ELIM-$NO_x$™ systems sold by CCA (Combustion Components Associates). One problem with this type of injector is the high response time.

Hence, some SCR systems use injectors similar to those used for fuels (for example, magnetic needle injectors) which have a lower response time and which function well mechanically. However, one problem linked to this type of injector regards the low flow rates required for SCR applications, considering the fact that the injectors for fuel systems generally have flow rates that are 2 to 4 times higher.

U.S. Pat. No. 6,063,350 describes an SCR system that uses an injector controlled by a PWM (Pulse Width Modulation) signal. Such a signal is generally in the form of a square-wave voltage, i.e. a train of rectangular electrical pulses having a given duration and amplitude and emitted with a given period. These electrical pulses actuate a coil (solenoid) which moves the needle of the injector to its open position. Generally, the duration of the pulses is varied (therefore: the opening time of the injector is varied) in order to vary the flow injected, hence the name of this type of control (PWM). The advantage of only varying the duration and not the frequency of the pulses lies in the fact of having a linear relationship between the opening time and the amount (flow) injected, hence a greater metering precision. However, at the lowest and/or highest flow rates, the Applicant has observed that this linearity was greatly affected.

This could be due to the fact that this type of injector has a response time on opening and on closing (which generally take place under the effect of an electrical pulse). In its resting state, a spring (or other return device) generally holds the needle in order to seal the orifice of the injector. At low flow rates, the mechanical opening time of the injector may be of the order of the effective injection time (needle in the top position, unblocking the orifice), and therefore the injector loses its linear behaviour, in extreme cases: the injector will not have time to open. Conversely, when the injector does not have time to close it loses its linear behaviour.

It could therefore be possible to consider working at a constant injection time but at a variable frequency. This way of proceeding specifically makes it possible to choose a sufficient time (as a function of the injector) so that the latter can open even at the lowest flow rate. Furthermore, this requires only one calibration point (the amount injected being directly proportional to the frequency of the pulses). However, the Applicant has observed that by increasing the flow rate, the injection frequency sometimes became unnecessarily high and could cause premature ageing of the injector. In certain extreme cases, it was even observed that the injector sometimes did not have time to close, breaking the proportionality relationship established between the flow rate and the opening time and therefore increasing error.

Certain SCR systems work in an open loop, i.e. the amount of additive injected is not controlled (corrected) in a loop using, for example, a direct measurement of the effectiveness of the pollution control (via an $NO_x$ and/or urea sensor in the exhaust gases for example). This is because, in certain vehicles, this loop is located outside of the perimeter of the system, for example in a control unit already present in the vehicle, for example that of the engine or ECU (Engine Control Unit). Therefore, it is necessary to ensure that the injector is indeed capable of opening and closing over its entire range of use, i.e. it is necessary to be sure not to drop below the minimum opening time and not to exceed the maximum opening time.

The present invention therefore aims to provide a system and a method for controlling an injector which results in accurate metering over the entire range of flow rates necessary in an SCR system (which may range from 15 g/h to 1500 g/h or even 3000 g/h) and this being, after all, with a reduced number of calibration curves and with safety as regards the effective opening of the injector at low flow rate and/or its closure at high flow rate.

For this purpose, the present invention relates to a method for controlling an injector intended for injecting a pollution-control liquid additive into the exhaust gases of an internal combustion engine at a flow rate governed by a given frequency and opening time of the injector, the injector having a calibration curve that establishes, at given frequency, pressure, temperature and nature of the liquid, the amount of liquid injected during an opening of the injector as a function of the duration of this opening, this curve comprising at least one linear zone (calibration line) and a non-linear zone, said method being characterized in that in the linear zone the parameters of the calibration line are used and in the non-linear zone use is made of a set opening time and a variable frequency according to at least one calibration point established for this purpose.

In other words: use is only made of the part of the calibration curves for which the linearity is almost perfect (and by so doing, where the metering accuracy is high) and outside, calibration points obtained at a set injection time are used.

Specifically, one calibration point per opening time suffices, since the flow rate is then simply obtained by multiplying the amount injected during this time by the frequency. If there are several opening times there will be as many calibration points.

Subject to choosing a set time equal to the minimum time required for the opening of the injector to be effective ($t_{min}$) for the lowest flow rates (i.e. in the non-linear zone that extends, where appropriate, from the lowest possible flow rate to the flow rate at which the behaviour of the injector becomes linear), it is possible to work in an open loop with good precision.

With the urea injectors derived from fuel injectors, the calibration curve generally departs from linearity well after the maximum flow rate required for the SCR additive and therefore it is generally possible to work at a set frequency and variable opening time over the entire range of flow rates except for at low flow rates, where use is therefore made of one or more constant opening times chosen close to the minimum opening time of the injector ($t_{min}$).

However, with the specific urea injectors mentioned previously it is also possible to observe a non-linearity at the high flow rates that the subject matter of the present invention therefore also makes it possible to treat. Moreover, with this type of injector, it may be necessary to work at at least 2 given frequencies in order to be able to cover the entire range of desired flow rates (see values above). Therefore, one method according to a variant of the invention uses at least 3 different working zones, or even 4: a $1^{st}$ at a variable frequency and constant opening time, greater than or equal to the minimum opening time of the injector for the low flow rates; a second at a set frequency and opening time that varies according to the requested flow rate (which is greater than the maximum flow rate attained for the $1^{st}$ range); a third also at a set frequency and opening time that varies according to the requested flow rate (but which is this time greater than the maximum flow rate attained for the $2^{nd}$ range); and optionally a $4^{th}$ at a variable frequency and constant opening time, less than or equal to the maximum opening time of the injector.

FIG. 1 represents an exemplary calibration curve for use in embodiments of the present invention. The curve establishes, at given frequency, pressure, temperature and nature of the liquid, the amount of liquid injected during an opening of the injector as a function of the duration of this opening. The curve comprises a linear zone and a non-linear zone. A method according to a variant of the invention uses at least 4 different working zones: a $1^{st}$ at a variable frequency and constant opening time, greater than or equal to the minimum opening time of the injector for the low flow rates (illustrated as calibration point a in the lower non-linear zone); a second at a set frequency and opening time that varies according to the the requested flow rate (illustrated as variable point b in the linear zone); a third also at a set frequency and opening time that varies according to the requested flow rate (also illustrated as variable point b in the linear zone); and a $4^{th}$ at a variable frequency and constant opening time, less than or equal to the maximum opening time of the injector (illustrated as calibration point c in the upper non-linear zone).

In other words, in this variant, to achieve increasing flow rates use is made of a set opening time ($t_{min}$, e.g. 2 to 3 ms) and variable frequency until a certain flow rate is obtained; then use is made of a given frequency and a variable opening time until a second flow rate is reached; next, use is also made of a given (but higher) frequency and a variable opening time and finally, if necessary, use is made of a set opening time (e.g. 60 to 65 ms) and variable frequency.

The method according to the invention is preferably intended for an SCR system for exhaust gases of an internal combustion engine, in particular of a vehicle.

The expression "SCR system" is understood to mean a system for the catalytic reduction of the $NO_X$ from the exhaust gases using a liquid ammonia precursor that is preferably urea.

The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

In the method according to the invention, the injector may be either what is called an "active" injector, i.e. one that includes a metering function, or what is called a "passive" injector then coupled to an additional metering device, such as a metering valve for example. It is advantageously a passive injector, and in particular a nozzle or spray gun making it possible to obtain drops of solution having a diameter between 5 and 100 µm. Such a nozzle is advantageously equipped with an orifice having a diameter of around 150 µm-250 µm. This orifice is preferably supplied by a system of narrow channels (3-4) producing a "swirl" (vortex) phenomenon in the solution upstream of the nozzle. Such injectors have been specially developed for the SCR application. Alternatively, it may be a simple injector derived from fuel injectors. This type of injector may, for example, have one or even four 230 µm diameter orifices that produce an average droplet diameter of around 140 µm at an operating pressure of 5 bar.

Within the context of the invention, the switch from one strategy to the other is carried out using the electronic control module (ECM) based on a comparison between the desired flow rate (Q or setpoint flow rate) and the calibration curve [amount injected=f (opening time) or q=f(t)] and possible additional flow rates at chosen opening times. The ECM deduces therefrom where the desired operating point is located (in or outside of the linearity zone) and chooses the appropriate control mode (set frequency-variable opening time or vice versa).

Figure 2:
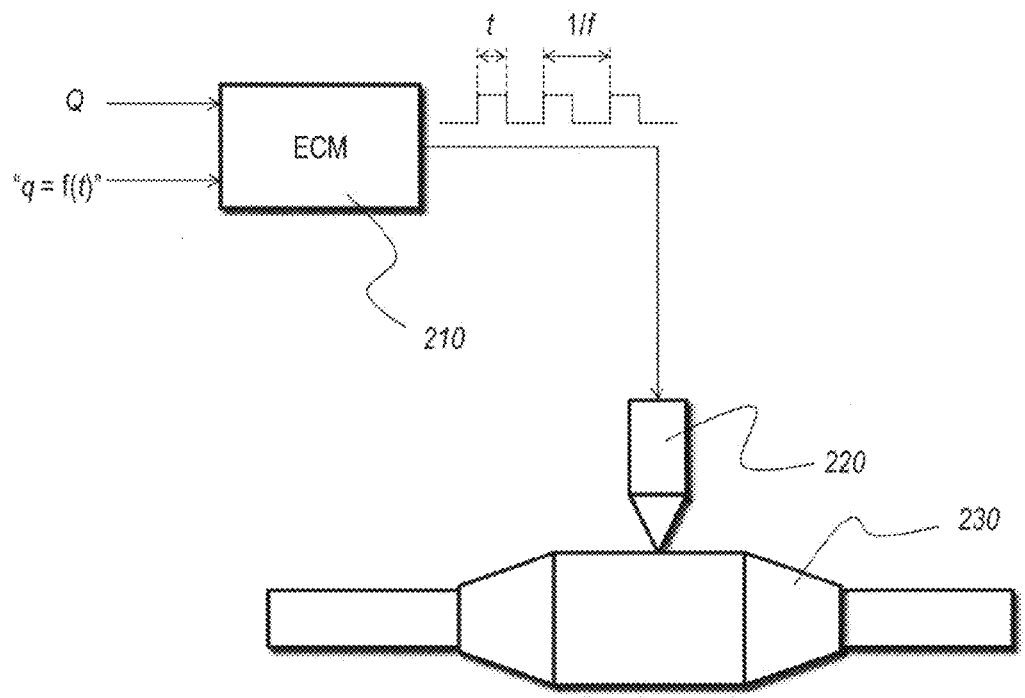

FIG. 2 illustrates an exemplary system comprising a controller (ECM) 210, which controls the injector 220 based on a comparison between the desired flow rate (Q) and the calibration curve ("q=f(t)"). The ECM produces the variable frequency f and/or opening time t of the injector 220 as described above. The injector 220 is arranged to inject a pollution-control liquid additive into exhaust gases of an internal combustion engine in the exhaust pipe 230.

In general, the calibration curve (which is specific to a given injector and which is obtained by plotting the flow rate obtained as a function of the opening time of the injector for a given frequency) is not used as such by the ECM, but rather the point for switching from one strategy to the other, which is obtained from this curve. As explained previously, at very short opening times the flow rate does not vary linearly with time and the "switching threshold" refers to the time (and associated from rate) below which the flow rate does not vary linearly with time and where it is therefore necessary to work at a variable frequency (and set time).

Non linearity can be asserted for instance when the difference between the calibration curve and the straight line obtained through linear regression thereof, exceeds 5%.

The ECM then compares the desired flow rate to the threshold flow rate and determines the associated operating mode. In the case of an increase in flow rate and starting from the minimum flow rate, the mode will change from "variable frequency and set opening time" to "set frequency and variable opening time". In the case of a reduction in flow rate and starting from the maximum flow rate, the mode will change from "set frequency and variable opening time" to "variable frequency and set opening time".

Given the fluctuations linked to the operation of the engine, the requested flow rates at the injector may undergo strong variations, even for a relatively "stable" operating mode. Therefore, to avoid incessant mode changes when the flow rate is in the switching zone, one advantageous variant of the invention consists in using a hysteresis effect to drive the switch from one mode to the other. In this variant, two different thresholds will be entered into the ECM, for example: the (flow rate) threshold where the curve becomes non-linear (for the lowest flow rates) or "bottom" threshold, and this (flow rate) threshold plus a safety margin (for example: 5 or even 10%), or "top" threshold.

Thus, in the case of an increase in flow rate and starting from the minimum flow rate, the mode will change from "variable frequency and set opening time" to "set frequency and variable opening time" at the top threshold only. And in the case of a reduction in flow rate and starting from the maximum flow rate, the mode will change from "set frequency and variable opening time" to "variable frequency and set opening time" at the bottom threshold. Therefore, in the zone of flow rates between the two thresholds, the requested flow rate at the injector may fluctuate (for example by 5 or even 10%) without causing untimely mode changes.

This method makes it possible to retain a good compromise between precision and untimely mode changes.

As mentioned previously, SCR systems generally comprise, besides the aforementioned injector, at least one tank for storing the urea solution and also a system for feeding this to the exhaust gases, and which generally comprises active components such as a pump, filter, valve(s), conduits (feed and/or return conduits), etc.

Generally, in order to ensure accurate metering, the pump is controlled so as to ensure, at its outlet, the most stable pressure possible. Advantageously, this is a rotary pump, the outlet pressure of which is controlled by a controller equipped with a PID regulator which acts on its rotational speed. Most particularly preferably, the pressure setpoint originates from a PWM type signal sent by an electronic control module (ECM) to the pump controller and this signal also having information relating to the rotational direction of the pump, information of the stopping and/or starting of the pump and information as regards the diagnostics on the operation of the pump. Such a control system is the subject of Application FR 0700358 in the name of the Applicant, of which the content is, for this purpose, incorporated by reference in the present application.

Despite recourse to such a system, it may well be that the outlet pressure of the pump (i.e. generally at the inlet of the injector) is not equal to the setpoint pressure in certain cases. For example, at high flow rate and/or in the presence of a leak, the pump may "saturate", i.e. not attain its setpoint pressure. Furthermore, in the commercially available pumps, the setpoint pressure may vary within a same range (typically may be equal to a given value +/−10% or even 20% or so especially during long injections at low frequency).

Moreover, in certain cases it may be advantageous to intentionally choose a pressure higher or lower than that for which the injector has been calibrated (for example, it may be considered to reduce the pressure in order to attain the lowest flow rates and/or to make savings, to reduce wear and therefore to increase the lifetime of certain injectors).

In accordance with Bernoulli's law, for a given mode of operation (given opening time and frequency) the flow rate of the injector varies as a function of the prevailing pressure difference between the inlet and outlet of the injector (the latter generally being atmospheric pressure).

Therefore, according to one advantageous variant of the invention, the feed pressure of the injector is measured and the injection parameters of the injector (opening time and/or frequency) are modified as a function of the generalized Bernoulli's law.

This correction can be carried out by a simple calculation. Specifically, in the case of an injector, application of the generalized Bernoulli's law generally results in the following equation (for example, see formula 1.49 in Mémento des pertes de charges [Memorandum on pressure drops], I.E. Idel'cik, Volume 13, Coefficients of singular pressure drops and of friction pressure drops, translation from Russian by Mrs Meury, 1999, p 28, Edition Eyrolles):

$$Q_{injector} = \mu_{injector} \cdot F_{0,injector} \cdot \sqrt{2 \cdot g \cdot H} \quad (1.49\text{-p. }28)$$

where:

$$\rho_{urea} \cdot g \cdot H = \Delta P_{injector}$$

hence: $Q_{injector} = \mu_{injector} \cdot F_{0,injector} \cdot \sqrt{\dfrac{2}{\rho_{urea}} \cdot \Delta P_{injector}}$ with:
- $Q_{injector}$=flow rate of the injector
- $\mu_{injector}$=its flow coefficient (can be determined experimentally and/or via the memorandum itself)
- $F_{0,injector}$=the cross section of its injection orifice
- $\rho_{urea}$=density of urea
- $\Delta P_{injector}$=pressure difference between the inlet and outlet of the injector, namely $\Delta P_{injector} = P_{urea} - P_{atm}$.

Hence:

$$\dfrac{Q_{injector,ref}}{Q_{injector,new}} = \dfrac{\mu_{urea,ref}}{\mu_{urea,new}} \sqrt{\dfrac{\Delta P_{injector,ref}}{\Delta P_{injector,new}}}$$

namely a correction factor $\alpha_{pressure}$:

$$\alpha_{pressure} = \dfrac{\mu_{urea,ref}}{\mu_{urea,new}} \sqrt{\dfrac{\Delta P_{injector,ref}}{\Delta P_{injector,new}}}$$

with: $P_{urea,ref}$=the pressure at which the injector was calibrated and $P_{urea,new}$=the pressure actually measured by the sensor.

It emerges from the aforegoing that in the method according to the invention, the injector may be calibrated at a single pressure (i.e. it is sufficient to establish the line of correspondence respectively between the opening time and the flow rate for a given pressure and that the opening time values for the other pressures may be deduced by calculation). This has been successfully verified experimentally by the Applicant.

The injector in question in the method according to the invention is preferably fed by an electrical signal, for example of the PWM type. It may also be an injector of the peak & hold type, etc. In particular, it may be a piezoelectric or magnetic injector, the latter being preferred. Generally, such an injector comprises at least one coil that, when an electrical current is passed through it, generates a magnetic field that exerts an attractive force on a magnetic component attached to (or actuating) a movable part that sometimes obstructs and sometimes unblocks an injection orifice. Generally, this movable part is in the form of a needle.

In the case of magnetic valves or any other electrical device for actuating the opening of an injector intended for an SCR system onboard a vehicle, the electrical signal for controlling the injector is generally a voltage generated by the battery and/or the alternator of the vehicle. Depending on the conditions (starting or driving at speed), this voltage may vary from 9 to 16 V approximately. This is the reason why, when the method according to the invention is applied to such a system (or to any other system where the electrical signal is generated from a voltage source onboard a vehicle that does not produce a constant voltage throughout the operation of the SCR system), the changes in voltage, especially at short injector opening times, lead to undesired flow rate drifts.

The lower the current passing through the coil of the injector, the smaller the field. Therefore, the mechanical opening time of the injector is increased and the effective injection time is decreased, hence: the flow rate decreases. This phenomenon becomes increasingly critical when the mechanical opening time of the injector is of the order of the effective injection time (needle in the top position, unblocking the orifice). In short, for low flow rates, the decrease of the voltage leads to a decrease of the flow rate (and vice versa for the rest). It is noted that the Applicant observed that the decrease of the voltage did not influence the flow rate when the injector was constantly open, which tends to prove that the voltage only has an influence on the opening time (and not on the position of the needle in the injector when this needle is in the top position).

Therefore, according to one advantageous variant of the invention, the opening time is directly or indirectly corrected as a function of the voltage variations so that the system for controlling the injector renders the injector practically independent of the electrical (voltage and/or current) fluctuations.

For example, for an injector controlled by a PWM type signal, during a voltage variation in the generation of the PWM signal, the strategy will compensate, owing to nomograms, for the width of the voltage pulse so that the effective injection time will remain unchanged.

The same principle may be applied to the control of an injector in "peak and hold" mode, which aims to optimize the current consumption and therefore the energy transmitted to the injector, but also to reduce the heat dissipated by the injector. The opening of such an injector then breaks down into two phases:
1. A phase known as a "peak" phase consists in raising the current in the coil of the injector enough to make the needle inside the injector move and thus unblock its opening. The end of this phase is established when the needle completely unblocks the injection orifice with a safety margin in addition (mainly linked to the manufacturing tolerances) in order to ensure that the opening has been correctly achieved.
2. The phase known as a "hold" phase consists in keeping the injector open. For this, the current passing through the coil of the injector must be high enough to overcome the force of the return spring. Overall, since the force necessary for this action is lower than in the case of opening the injector, the hold current is much lower.

The resulting signal known as a "peak and hold" signal is a high current profile over a short time ("peak" phase) then medium current profile over a longer time ("hold" phase). The sum of the "peak" time and the "hold" time corresponds to the opening time ("ON").

Still from the same perspective, for a "peak and hold" injector, during a variation in the control voltage of the injector, the strategy will compensate, owing to nomograms, for the "peak" time so that the current passing through the coil of the injector remains the same. An improvement in this compensation for variation in the voltage consists in also adapting the total injection time so that the effective injection time will remain unchanged.

The coil of the injector regardless of the type of injector ("peak and hold" or "PWM") may lose its effectiveness, especially via the increase in heat at the coil of the injector. This heat supply may have various origins, in particular due to the fact that the injector is attached to the silencer, the temperature of which varies from around 200° C. to 400° C. in normal operation.

Therefore, according to one advantageous variant of the invention, the opening time is directly or indirectly corrected as a function of the variations in exhaust temperatures so that the system for controlling the injector renders the injector practically independent of the temperature fluctuations of the coil of the injector.

For example, during a temperature variation of the coil and knowing the temperatures of the exhaust gases or modelling the behaviour of the temperature of the coil of the injector, the strategy will compensate, owing to nomograms, for the length of the opening control signal so that the effective injection time will remain unchanged.

The present invention also relates to an SCR system capable of using the method described above and comprising, for this purpose:
an injector capable of injecting a liquid flow rate, which varies depending on its opening time and frequency, into the exhaust gases of an internal combustion engine; and
a controller capable of acting on the injector to independently vary either its frequency or its opening time, this being in set ranges of opening times or frequencies respectively.

The invention claimed is:
1. A method for controlling an injector intended for injecting a pollution-control liquid additive into exhaust gases of an internal combustion engine at a flow rate governed by a given frequency and opening time of the injector, the injector having a calibration curve that establishes, at given frequency, pressure, temperature and nature of the liquid, an amount of liquid injected during an opening of the injector as a function of the duration of the opening time, the curve comprising at least one linear zone (calibration line) and a non-linear zone, said method comprising:
determining whether a predetermined flow rate falls within the linear zone of the calibration curve;
if said predetermined flow rate falls within the linear zone of the calibration curve, using a set frequency and determining a variable opening time to obtain the predetermined flow rate on the basis of the calibration line;
if said predetermined flow rate does not fall within the linear zone of the calibration line, using a set opening time and determining a variable frequency on the basis of at least one calibration point;
controlling said injector in accordance with the determined opening time and frequency,
wherein said set opening time is greater than or equal to a minimum time ($t_{min}$) required in order for the opening of the injector to be effective, if said predetermined flow rate is lower than said linear zone, and
wherein, to achieve increasing flow rates, use is made of the set opening time and the variable frequency until a certain flow rate is obtained, then use is made of the given frequency and the variable opening time until a second flow rate is reached; next, use is also made of a given, but higher, frequency and a second variable opening time and finally, if necessary, use is made of another set opening time and a third variable frequency.

2. The method according to claim 1, wherein at low flow rate the opening set time is greater than or equal to the minimum time ($t_{min}$) required in order for the opening of the injector to be effective.

3. The method according to claim 2, wherein use is made of a set frequency and variable opening time of the injector over the entire range of flow rates except for the low flow rate, where use is made of a calibration point that gives the flow rate as a function of the frequency for the set opening time greater than or equal to the minimum opening time ($t_{min}$) of the injector.

4. The method according to claim 1, wherein the pollution-control additive is a eutectic water/urea solution.

5. The method according to claim 1, using an electronic control module (ECM) that chooses, based on a comparison between the desired flow rate (Q or setpoint flow rate) and the calibration curve [amount injected=f (opening time) or q=f (t)] or at least one information deduced from the curve, and additional flow rates at chosen opening times, the control mode (set frequency–variable opening time or vice versa).

6. The method according to claim 5, using a pressure difference between the pressure measured at the inlet of the injector and the pressure used to calibrate the injector in order to directly or indirectly modify the opening time and/or the frequency of control of the injector.

7. The method according to claim 5, wherein the injector is an injector for which the opening control is established by an electrical signal.

8. The method according to claim 7, wherein, when the electrical signal controlling the injector is generated using a source that delivers a variable voltage, the frequency and/or opening time of the injector are corrected directly or indirectly as a function of the variation of this voltage.

9. An SCR system for controlling an injector intended for injecting a pollution-control liquid additive into exhaust gases of an internal combustion engine at a flow rate governed by a given frequency and opening time of the injector, the injector having a calibration curve that establishes, at given frequency, pressure, temperature and nature of the liquid, an amount of liquid injected during an opening of the injector as a function of the duration of the opening time, the curve comprising at least one linear zone (calibration line) and a non-linear zone, said system comprising:

an injector that injects a liquid flow rate, which varies depending on its opening time and frequency, into the exhaust gases of an internal combustion engine; and a controller configured to control the injector to independently vary either a frequency or an opening time, being in set ranges of opening times or frequencies respectively, said controller:

determining whether a predetermined flow rate falls within the linear zone of the calibration curve;

if said predetermined flow rate falls within the linear zone of the calibration curve, using a set frequency and determining a variable opening time to obtain the predetermined flow rate on the basis of the calibration line;

if said predetermined flow rate does not fall within the linear zone of the calibration line, using a set opening time and determining a variable frequency on the basis of at least one calibration point;

said controller configured to control said injector in accordance with the determined opening time and frequency, wherein said set opening time is greater than or equal to a minimum time ($t_{min}$) required in order for the opening of the injector to be effective, if said predetermined flow rate is lower than said linear zone, and wherein, to achieve increasing flow rates, use is made of the set opening time and the variable frequency until a certain flow rate is obtained, then use is made of the given frequency and the variable opening time until a second flow rate is reached; next, use is also made of a given, but higher, frequency and a second variable opening time and finally, if necessary, use is made of another set opening time and a third variable frequency.

* * * * *